United States Patent [19]

Jabarin

[11] Patent Number: 4,535,025

[45] Date of Patent: Aug. 13, 1985

[54] ORIENTED, HIGH DENSITY POLY(ETHYLENE TEREPHTHALATE)

[75] Inventor: Saleh A. Jabarin, Holland, Ohio

[73] Assignee: Owens-Illinois, Inc., Toledo, Ohio

[21] Appl. No.: 628,360

[22] Filed: Jul. 6, 1984

Related U.S. Application Data

[63] Continuation of Ser. No. 537,129, Sep. 29, 1983, abandoned, which is a continuation of Ser. No. 427,063, Sep. 29, 1982, abandoned.

[51] Int. Cl.³ .................. B32B 27/36; B29D 17/02
[52] U.S. Cl. .................................. 428/220; 428/480; 428/910; 528/308.2
[58] Field of Search ............... 428/910, 480, 483, 220; 528/308.2; 264/290.2

[56] References Cited

U.S. PATENT DOCUMENTS

| | | | |
|---|---|---|---|
| 3,432,591 | 3/1969 | Heffelfinger | 528/308.2 |
| 3,547,748 | 12/1970 | D'Onofrio et al. | 428/910 |
| 3,950,206 | 4/1976 | Adachi et al. | 428/910 |

Primary Examiner—Paul J. Thibodeau
Attorney, Agent, or Firm—Philip M. Rice; John R. Nelson

[57] ABSTRACT

Disclosed is a new ductile poly(ethylene terephthalate) material which is clear, biaxially oriented and has a density of over 1.4050 grams/cc. at 25° C.

2 Claims, No Drawings

ORIENTED, HIGH DENSITY POLY(ETHYLENE TEREPHTHALATE)

This is a continuation of application Ser. No. 537,129 filed Sept. 29, 1983 now abandoned which is a continuation of Ser. No. 427,063 filed Sept. 29, 1982 and now abandoned.

This invention relates to a new ductile poly(ethylene tetephthalate) material which is clear, biaxially oriented and has a density of over 1.4050 grams/cc. at 25° C.

Poly(ethylene terephthalate), hereinafter called PET, finds many packaging uses, such as a packaging sheet or film, or hollow containers. The normal products of commerce have fairly good or low permeabilities to gases such as $CO_2$ and $O_2$.

However, it is often desirable that PET have even lower gas permeabilities and the gas permeability of PET can be decreased by increasing the density thereof through heating to cause crystallization with consequent density increase. It is also usually desired that such PET materials, especially those used for packaging, be clear rather than opaque or even translucent.

It is an object of the present invention to provide new, ductile substantially clear, biaxially oriented, high density PET material useful for packaging.

Other objects, as well as aspects and advantages of the invention, will become apparent from a study of the accompanying disclosure and claims.

According to the invention there is provided clear, biaxially oriented, ductile PET material of an inherent viscosity of at least 0.6 dl./gm., having two opposing generally parallel surfaces of extended area compared to the area of any cross-section generally perpendicular to and cutting the two surfaces of extended area, and having a density of at least 1.4050 grams/cc. measured at 25° C. The area of one of the extended surfaces is generally at least 10 times the area of such cross-section. Thus, the material of the invention includes film or sheet material or a wall of a hollow body such as a hollow container. The thickness of such cross-section is usually less than 50 mils, more commonly from 0.5 to 35 mils.

The prior art teaches that PET film can be oriented and "heat set" to cause crystallization and consequent increase in density up to a density of 1.402. Thus in col. 13 of du Pont Wyeth U.S. Pat. No. 3,733,309 it is stated that the maximum crystallinity attainable in biaxially oriented PET bottles is about 60% and in col. 4 it is stated that the 60 percent figure corresponds to a density of 1.402 grams per cubic centimeter. See also claim 1. Another du Pont patent to Heffelfinger, U.S. Pat. No. 3,432,591, bears this out, saying that heat setting of PET film carried to a density over 1.400 would lead to a loss of toughness. The products of the present invention on the other hand are tough, ductile and clear.

In Japanese published application No. 41,972, laid open Apr. 3, 1979, it is disclosed heat setting should be limited so that the density does not exceed 1.40 grams/cc., important from the standpoint of clarity.

By "clear" PET herein and in the claims is meant that the percent haze measured according to ASTM D 1003-61 (reapproved 1977) does not exceed 10 percent. It is usually below 3 percent.

The new high density, clear, ductile and tough poly(ethylene terephthalate) material of the present invention can be made by biaxially stretch orienting PET at a temperature conducive to orientation, usually in the range from 75° to 120° C. and more often from 85° to 110° C.; thereafter, while the PET is under restraint preventing shrinkage further heating said PET at temperatures of at least 230° C. until its density is over 1.4050. Usual heat setting temperatures are 230° to 250° C.

In the following examples the products all had the properties of the invention mentioned hereinbefore.

In Examples 1–4 and the control example, tabulated in Table 1, 2 liter capacity PET bottles were blow molded at an orientation temperature of about 90° C. The stretch ratio was about 4 in the hoop direction and about 2 in the axial direction. The density of the oriented bottle sidewalls was about 1.368. This density shows that crystallization took place during orientation, as expected. The bottles were blown into conformance with a cold mold; thus the stress due to the stretch blow molding was frozen in. Square pieces were cut from the bottle sidewalls; all except the control sample were clamped in a frame which prevented shrinkage. They were then dried in an oven at 100° C. at high vacuum overnight. Then they were heated in the same oven at high vacuum at 240° C. for the times noted in Table 1, which also shows the thickness, oxygen permeability in cc·mil/100in$^2$·day·atm, density and percent haze.

TABLE 1

| Example No. | Heat Setting Time, Hrs | Thickness, mils. | Oxygen Permeability | Density gms/cc | Percent Haze |
| --- | --- | --- | --- | --- | --- |
| Control | none | 11.5 | 4.3 | 1.3680 | 1.6 |
| 1 | 1 | 12.4 | 3.5 | 1.4070 | 1.9 |
| 2 | 4 | 15.1 | 2.8 | 1.4108 | 2.2 |
| 3 | 4 | 19 |  | 1.4130 | 8$^{(a)}$ |
| 4 | 16 | 17.2 |  | 1.4190 | 7 |

$^{(a)}$haze apparently mostly due to surface scratches

EXAMPLE 5

PET film of 20 mil thickness and having an inherent viscosity of 0.67 dl./gm. was clamped in a Long Extensional Tester, heated to about 90° C. and stretched at a rate of 150%/Sec. The stretch ratio was 3.8×3.5 and the final thickness 1.5 mils. The biaxially oriented stretched film was cooled with an air hose. Its density was 1.3600. The film was then clamped in a frame preventing shrinkage, dried overnight in a vacuum oven at 100° C. and was heated in an oven under high vacuum for 4 hours at 240° C. The film was then cooled and removed from the frame. Its density at 25° C. was 1.4080 and it had less than 1 percent haze.

EXAMPLE 6

PET film of a nominal 20 mil thickness and having an inherent viscosity of 0.66 dl./gm. was clamped in a Long Extensional Tester, heated to about 90° C. and stretched at a rate of about 150%/Sec. in the machine direction. The stretch ratio was 3.8×2 and the final thickness 2.8 mils. The biaxially oriented stretched film was cooled with an air hose. The film was then clamped in a frame preventing shrinkage, dried overnight in a vacuum oven at 100° C. and was heated in an oven under high vacuum for 4 hours at 250° C. The film was then cooled and removed from the frame. Its density at 25° C. was 1.4108 and it had 1.1 percent haze.

When inherent viscosity is referred to herein, it is the viscosity as measured in a 60/40 weight ratio phenol/tetrachloroethane solution at 25° C. Density was determined by the method described in ASTM 1505, entitled "Density Gradient Technique."

As will be evident to those skilled in the art, various modifications of this invention can be made or followed in the light of the foregoing disclosure and discussion without departing from the spirit and scope of the disclosure or from the scope of the claims.

I claim:

1. Biaxially oriented and heat set poly(ethylene terephthalate) material which has two substantially parallel faces each of an area which is extended as compared to the area of any planar cross-section cutting said two faces, the ratio of the said extended area to said cross-sectional area being at least 10, said poly(ethylene terephthalate) being clear, ductile and having a density at 25° C. of over 1.4050 and a percent haze of no more than 10 percent.

2. Poly(ethylene terephthalate) material of claim 1 wherein said two faces are separated by less than 50 mils.

* * * * *